INVENTOR.
NORMAN S. POLLACK

BY
*Laurence S. Epstein*
ATTORNEYS

INVENTOR.
NORMAN S. POLLACK
BY
*Lawrence S. Epstein*
ATTORNEYS

United States Patent Office 3,394,270
Patented July 23, 1968

3,394,270
PLURAL INPUT VOLTAGE COMPARING
SIGNAL GENERATOR
Norman S. Pollack, Commack, N.Y., assignor, by mesne assignments, to the United States of America as represented by the Secretary of the Navy
Filed Feb. 5, 1965, Ser. No. 430,781
2 Claims. (Cl. 307—235)

ABSTRACT OF THE DISCLOSURE

A gate generator circuit for providing a high output voltage when first and second varying D.C. input voltages of opposite polarity are of substantially equal magnitude, and a relatively low output voltage when the input voltages are not of substantially equal magnitude, the generator comprising first, second, and third inverter amplifiers normally so biased that the first and third transistors are at cut-off (or are non-conducting) while the second is conducting, summing means for providing a resultant voltage when the inputs are of different magnitude, and steering diode means for causing a resultant voltagte of one polarity to drive the first transistor and utimately also the third transistor to a conductive state, and for causing a resultant voltage of the opposite polarity to bias the second transistor to cutoff and hence the third transistor to a conductive state. Accordingly, the third or output transistor becomes conductive whenever the input voltages to the generator circuit are unequal, irrespective of which is the larger in magnitude.

This invention is utilized to compare two varying DC and more particularly to a DC voltage comparator for producing a gating voltage when two DC input voltages are of equal magnitude.

This invention is utilized to comparte two varying DC voltages, of opposite polarity, to produce a gate voltage which straddles the coincident point at which these DC input voltages are of equal magnitude. The width of the gate voltage, or the effective tolerance of the comparison, may be adjusted by variable control means, described infra.

This invention was developed to replace the conventional ring modulator comparator which had been previously used to serve the same purpose. This coincident gate generator, however, surpasses this ring modulator in simplicity and stability. It compares DC voltages directly, without the necessity for modulation and demodulation. Additionally, there is no need for an oscillator or transformer, because AC conversion from the DC voltage, is not required in this device. As a result, the number of transistors is less than half than previously utilized in the ring modulator, and consequently the quantity of resistors, capacitors, and miscellaneous components is also significantly reduced. As a result of this, this device is reduced in size to a point where it is possible to package the entire coincident gate generater on a very small printed circuit card. Additionally, the power requirements are a small fraction of those required for the aforementioned ring modulator. Furthermore, the device provides a very simple single means for adjusting the gate voltage width, which in contrast to the ring modulator, requires three interdependent adjustments. Also, the relative stability of the present invention is superior to that of the ring modulator.

Therefore one of the objects of the present invention is to provide a coincident gate generator which compares two varying DC voltages, of opposite polarity, and produces an electronic gate voltage which straddles the coincident point at which these DC input voltages are of equal magnitude.

Another object of the invention is to provide a simple and stable comparator.

An additional object of this invention is to provide a comparator for comparing DC voltages directlly, without the necessity for modulation and demodulation.

A still further object of the invention, is to provide a comparator which compares DC voltages without the necessity of AC conversion.

Another object of the invention, is to provide a DC voltage comparator whose size and power requirements are respectively very small and low.

An additional object of the invention is to provide a DC comparator circuit whose gate voltage's width can be adjusted by one control.

A still further object of the present invention, is to provide a DC comparator circuit whose gate voltage width is simply adjusted.

Other objects and many of the attendant advantages of this invention will be readily appreciated as the same becomes better understood by reference to the following detailed description when considered in connection with the accompanying drawings wherein.

Figure 1:
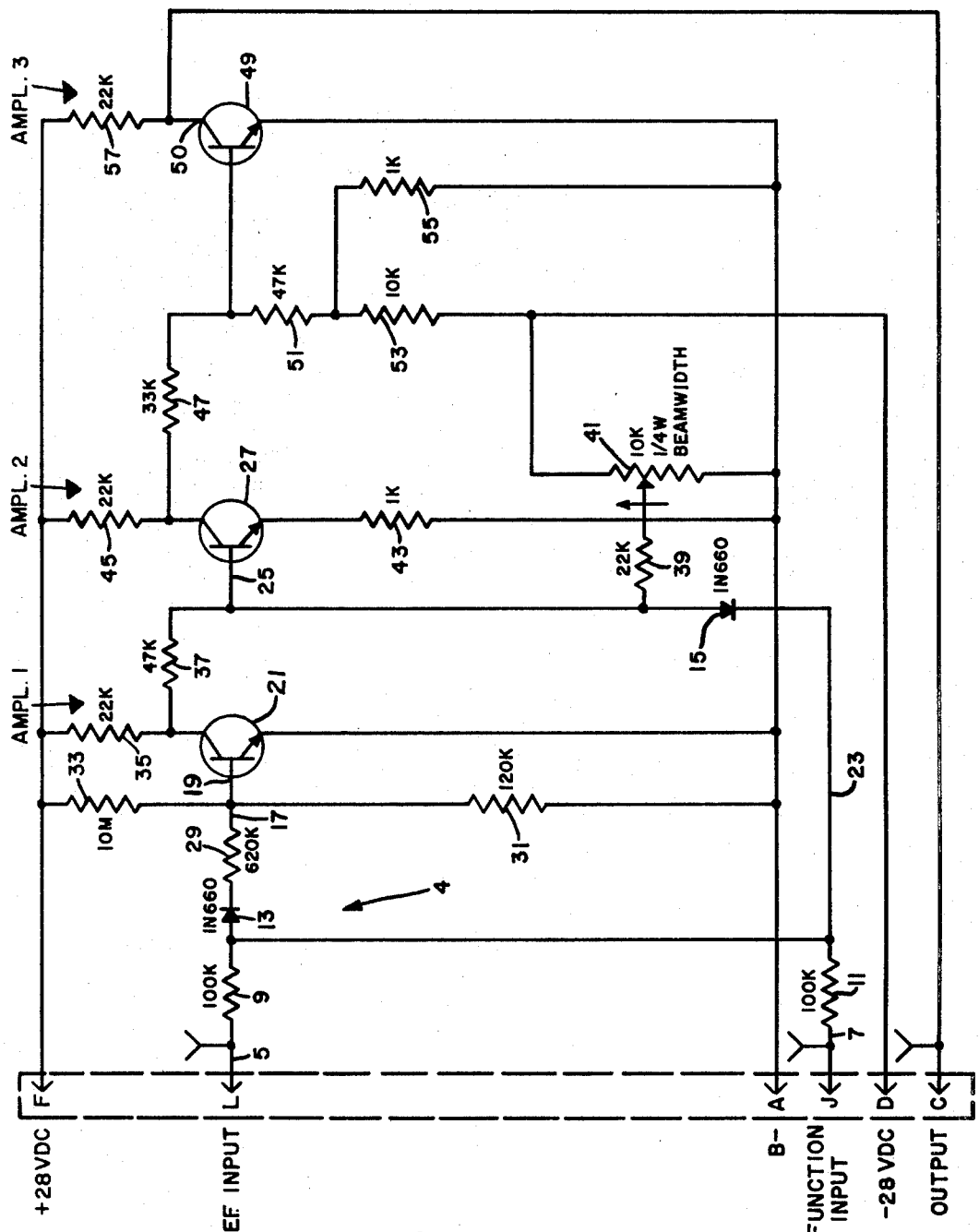
FIG. 1 is an electrical schematic diagram of one embodiment of the DC comparator circuit.

Referring to FIG. 1, this invention generally includes three amplifiers, amplifier 1, amplifier 2 and amplifier 3, and a summing means 4. Two input signals, a "Reference Input" signal and a "Function Input" signal, are coupled to said amplifiers. The reference signal input voltage, the first DC voltage, is transmitted over line 5, to the first input of the summing means 4. The function input signal, the second DC voltage is also transmitted to the second input of the summing means 4, over line 7. The summing means includes summing resistors 9 and 11, and steering diodes 13 and 15. Positive resultant output signal voltages are coupled over line 17, from the summing means 4, to the input of the first amplifier 1, to the base 19 of transistor 21. Negative resultant output signal voltages from the summing means 4 are coupled through diode 15, over line 23 to the base 25 of transistor 27 of the second amplifier-inverter 2. Resistors 29 and 31 are used to attenuate signal voltages coupled to transistor 21. Resistors 33 and 31 provide the necessary bias for transistor 21. The collector load of transistor 21 is resistor 35. Resistors 37 and 39 provide additional attenuation for amplifier 1. The combination of attenuations due to resistors 29, 31, 37 and 39 together with the particular gain of transistor 21, provides a total gain of unity which is required for proper functioning of this device. The output from amplifier 1 is coupled through resistor 47 to the input of amplifier 3. Amplifier 2, includes transistor 27, and resistors 35, 37, 39 and 41 provide the necessary biasing for transistor 27. Additionally, resistor 35 with emitter resistor 43 is utilized for temperature stability. The collector load of transistor 27 is resistor 45. The output of amplifier 2 is coupled through resistor 47 to the input of amplifier 3. Amplifier 3 includes transistor 49 and resistors 47, 51, 53 and 55, provide the proper biasing for said transistor 49. The output of amplifier 3 is taken across collector load 57. The particular adjustment at potentiometer 41, is determined by the desired beam width or gate voltage width required.

It is necessary that amplifier 1 be an inverting amplifier having a gain of one in order that positive resultant output signals are neither amplified nor attenuated by amplifier-inverter 1 at the point where they are coupled to the base 25 of transistor 27, as negative resultant output signals are directly coupled to the base 25 of transistor 27 of amplifier 2 without going through amplifier-inverter 2.

There are two inputs to this device. One input, a varying DC voltage, is termed the "Reference Input," and is that signal in this embodiment to which a comparison is made. The second input is a varying DC voltage, termed "Function Input," which represents a function to be compared to the reference input.

In operation, for a typical application, the reference input represents the sine of an antenna's elevation from 0° to 45°, and other comparison input represents the sine of a target's elevation, and the gate voltage width represents the beam width of the antenna. The former two input information signals are obtained from a conventional radar simulator. The gate produced in this illustration represents the time during which the target is within the elevation beam width of the antenna.

Figure 2:
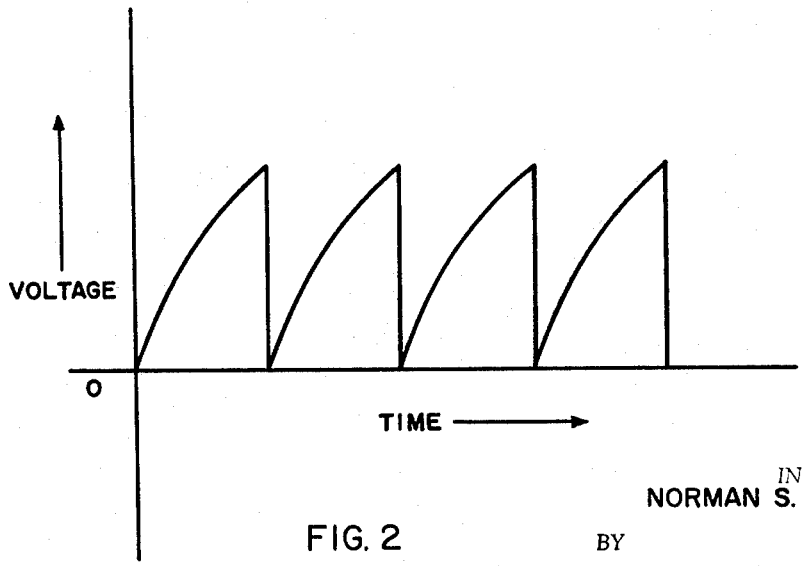
FIG. 2 is a waveform representing an antenna's elevation from 0° to 45°.

The basic principle of operation requires that the reference input function and the comparing function be of opposite polarity and equivalent magnitude. For this discussion, consider the reference input positive and a function of A Sine $\theta$ (where $\theta$ is antenna elevation, and varies from 0° to 45°). FIG. 2 is a representation of that waveform.

The comparing function represents a target's elevation. It is negative in polarity, and varies as a function of $-A$ sine $\alpha$ (where $\alpha$ is target elevation from 0° to 90°). For a typical target, at 30° elevation, there are three modes of circuit operation as follows:

Mode 1: Sum of A Sine $\theta$ and ($-A$ Sin $\alpha$) is negative.
Mode 2: Sum of A Sin $\theta$ and ($-A$ Sin $\alpha$) is zero.
Mode 3: Sum of A Sin $\theta$ and ($-A$ Sin $\alpha$) is positive.

Figure 3:
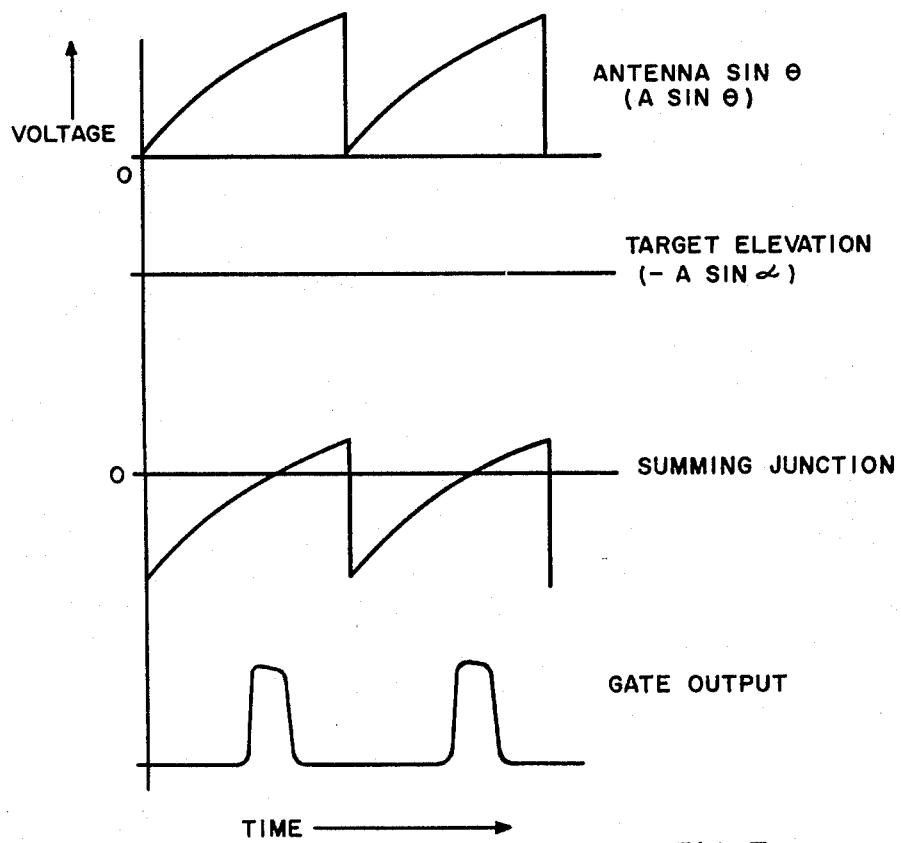
FIG. 3 is a graph of waveforms useful in explaining the operation of the embodiment of the invention of FIG. 1.

Referring to FIG. 1, the waveform illustrated in FIGS. 2 and 3, the two inputs are summed by resistors 9 and 11. The sum of the inputs appear at the junction of these resistors.

In mode number 2, when the sum of the input signals is zero, diodes 13 and 15 are back biased. The circuit is in its quiescent state. Transistor 49 is biased to cutoff, in this state, and the output is high.

Mode number 1 represents a condition where the antenna is below the target, yielding a negative resultant output signal at the output of the summing means 4. In this state, diode 15 conducts, turning transistor 27 off. This, in turn, saturates transistor 49 bringing its collector 50 to ground potential.

Mode number 3 represents the condition in which the antenna is above the target, resulting in a positive resultant output signal at the output of summing means 4. In this mode, diode 13 conducts, and turns on transistor 21 which in turn cuts off transistor 27, causing transistor 49 to saturate.

The biasing of transistor 27 determines the point at which transistor 27 cuts off for either a negative sum, or a positive sum (inverted by transistor 21 of amplifier 1). The actual generation of a gate occurs as follows:

With the antenna elevation starting below the target (mode 1), the device's output is low. As the antenna's elevation approaches the target's elevation, the sum approaches zero. At some fixed point before zero, which is determined by the setting of the beam width or gate voltage width adjustment, potentiometer 41, the output of the device goes high. The output now stays high until the antenna's elevation exceeds the target elevation by a given amount, again determined by potentiometer 41, at which point the output goes low again. Thus, a gate is created about the coincident point or "null," as illustrated by the waveforms of FIG. 3. The width of this gate voltage is controlled by the adjustment of potentiometer 41.

Obviously many modifications and variations of the present invention are possible in the light of the above teachings. It is therefore to be understood that within the scope of the appended claims the invention may be practiced otherwise than as specifically described.

What is claimed is:

1. A signal generator for providing a high voltage output signal when first and second D.C. input voltages of opposite polarity are of substantially equal magnitude, and a relatively low voltage output signal when said input voltages are not of substantially equal magnitude, said generator comprising:
    summing means connected to receive and algebraically sum said first and second input voltages to provide a resultant voltage having the polarity of the input voltage of larger magnitude when said input voltages are of different magnitudes;
    a first transistor connected in inverter-amplifier, common emitter configuration including biasing means normally biasing said first transistor to cut-off condition and having a gain of substantially unity;
    a second transistor connected in inverter-amplifier, common emitter configuration including adjustable biasing means normally biasing said second transistor to saturation condition;
    a first steering diode connected between said summing means and the base of said first transistor and oriented to pass resultant voltages of one polarity as an input thereto which will bias said first transistor to a conductive state;
    a second steering diode connected between said summing means and the base of said second transistor and oriented to pass resulting voltages of polarity opposite to said one polarity as an input to said second transistor and which will bias said second transistor to cut-off;
    resistive coupling means between the collector of said first transistor and the base of said second transistor so that the output of said first transistor when biased to a conductive state will bias said second transistor to cut-off;
    a third transistor connected in inverter-amplifier, common emitter configuration; and
    means coupling the output of said second transistor to the input of said third transistor whereby the latter provides said high voltage output signal whenever the second transistor is conductive, and said low voltage output signal whenever the second transistor is at cut-off.

2. A signal generator as defined in claim 1 and wherein:
    said adjustable biasing means comprises potentiometer means connected to a source of biasing voltage and to the base of said second transistor, said potentiometer means being operable to vary the resultant voltage required to drive said second transistor to cut-off.

References Cited

UNITED STATES PATENTS

| | | |
|---|---|---|
| 2,487,603 | 11/1949 | Scoles. |
| 2,773,981 | 12/1956 | Goodall. |
| 2,779,870 | 1/1957 | Henry et al. |
| 2,923,818 | 2/1960 | Wilson et al. |
| 2,970,261 | 1/1961 | Zoll _____ 328—116 X |
| 3,038,090 | 6/1962 | Patterson _____ 328—146 X |
| 3,039,024 | 6/1962 | Spooner. |
| 3,227,895 | 1/1966 | Gray _____ 307—88.5 |
| 3,311,835 | 3/1967 | Richman _____ 328—146 |

ARTHUR GAUSS, *Primary Examiner.*

DONALD D. FORRER, *Assistant Examiner.*